(12) United States Patent
Demoulin et al.

(10) Patent No.: US 8,278,843 B2
(45) Date of Patent: Oct. 2, 2012

(54) METHOD FOR OPERATING A SWITCHING-MODE POWER SUPPLY

(75) Inventors: Harald Demoulin, Mödling (AT); Ewald Lohninger, Seewalchen (AT)

(73) Assignee: Siemens Aktiengesellschaft, München (DE)

( * ) Notice: Subject to any disclaimer, the term of this patent is extended or adjusted under 35 U.S.C. 154(b) by 204 days.

(21) Appl. No.: 12/682,812

(22) PCT Filed: Oct. 6, 2008

(86) PCT No.: PCT/EP2008/063342
§ 371 (c)(1),
(2), (4) Date: Aug. 31, 2010

(87) PCT Pub. No.: WO2009/050054
PCT Pub. Date: Apr. 23, 2009

(65) Prior Publication Data
US 2010/0315837 A1    Dec. 16, 2010

(30) Foreign Application Priority Data
Oct. 17, 2007    (AT) ................ A 1667/2007

(51) Int. Cl.
  H05B 37/02    (2006.01)
  G05F 1/00    (2006.01)
(52) U.S. Cl. .......... 315/307; 315/85; 315/224; 315/225; 315/226; 315/360; 315/209 R; 315/219; 315/276; 315/283; 315/291; 315/294

(58) Field of Classification Search .................. 315/85, 315/307, 224–226, 360, 209 R, 219, 276, 315/283, 291, 294
See application file for complete search history.

(56) References Cited

U.S. PATENT DOCUMENTS

| | | | |
|---|---|---|---|
| 5,459,392 A | 10/1995 | Mandelcorn | |
| 5,636,106 A * | 6/1997 | Batarseh et al. | 363/16 |
| 6,249,876 B1 | 6/2001 | Balakrishnan | |
| 7,012,413 B1 | 3/2006 | Ye | |
| 7,227,652 B2 * | 6/2007 | Cronch et al. | 358/1.14 |
| 7,235,933 B1 * | 6/2007 | So | 315/291 |
| 7,944,156 B2 * | 5/2011 | Quazi | 315/307 |
| 2004/0136208 A1 * | 7/2004 | Agarwal et al. | 363/21.12 |

FOREIGN PATENT DOCUMENTS

| | | |
|---|---|---|
| EP | 0141061 A1 | 5/1985 |
| EP | 1199791 A2 | 4/2002 |
| EP | 0992105 B1 | 12/2003 |
| SU | 1125728 A1 | 11/1984 |

OTHER PUBLICATIONS

Sandra Johnson, Yan Yin, Ragan Zane; "Custom Spectral Shaping for EMI Reduction in Electronic Ballasts"; IEEE 2004; pp. 137-142.

(Continued)

Primary Examiner — Bao Q Vu

(57) ABSTRACT

A method for operating a switching power supply is provided. A switching element is switched on and off by a switching signal with a variable switching frequency. A frequency bandwidth is predefined for determining average levels of a frequency spectrum of the switching signal. The switching frequency is modulated by a modulation frequency greater than a frequency bandwidth.

18 Claims, 2 Drawing Sheets

OTHER PUBLICATIONS

F Lin, D Y. Chen; "Reduction of Power Supply EMI Emission by Switching Frequency Modulation"; Proceedings of the Annual Power Electronics Specialists Conference. (PESC). Seattle, Jun. 20-25 1993; Bd. CONF. 24, pp. 127-133, XP010149021; ISBN: 978-0-7803-1243-2.

A. Santolaria, J. Balcells, D. Gonzalez, J. Gago, S.D. Gil; "Reduction in Switched Power Converters by means of Spread Spectrum Modulation Techniques"; Power Electronics Specialists Conference, 2004. PESC 04. 2004 IEEE 35T H Annual Aachen, Germany Jun. 20-25, 2004, Piscataway, NJ, USA, IEEE, US; pp. 292-296; vol. 1, XP010738006; ISBN: 978-0-7803-8399-9.

"Low cost Green-Mode PWM Controller for Flyback Converters" System General Corp. / Fairchild Semiconductor Product Specification (SG6859), (online); Sep. 28, 2007; pp. 1-13, XP002517272 URL:http://www.fairchildsemi.com/ds/SG/SG6859.pdf; Oscillator Section p. 5.

Y.F. Zhang, L. Yang, and C.Q. Lee; "EMI Reduction of Power Supplies by BI-Frequency Modulation"; Applied Power Electronics Conference and Exposition, 1994. APEC '94. Conference Proceedings 1994., Ninth Annual Orlando, FL, USA Feb. 13-17, 1994, New York, NY, USA, IEEE; pp. 601-607, XP010118515; ISBN: 978-07803-1456-6.

Li Cai, Zhihui Yang and Wei Chen; "EMI reduction of switching power supply by frequency jitter"; Industry Applications Conference, 2005. Fourtieth IAS Annual Meeting. Conference Record of the 2005 Hong Kong, China; Oct. 1-6, 2005, Piscataway, NJ, USA,IEEE, vol. 4, pp. 2790-2793, XP010842803; ISBN: 978-07803-9208-3.

* cited by examiner

METHOD FOR OPERATING A SWITCHING-MODE POWER SUPPLY

CROSS REFERENCE TO RELATED APPLICATIONS

This application is the US National Stage of International Application No. PCT/EP2008/063342 filed Oct. 6, 2008, and claims the benefit thereof. The International Application claims the benefits of Austrian Application No. A1667/2007 AT filed Oct. 17, 2007. All of the applications are incorporated by reference herein in their entirety.

FIELD OF INVENTION

The invention relates to a method for operating a switching-mode power supply, comprising a switching element, which is switched on and off by means of a switching signal having a variable switching frequency, wherein a frequency bandwidth is predefined for determining average levels of a frequency spectrum of the switching signal. The invention also relates to a switching-mode power supply for implementing the method.

BACKGROUND OF INVENTION

Switching-mode power supplies generally switch at a clock frequency in the kilohertz range, with switching elements usually being activated by means of pulse-width modulated switching signals. The steep edges of the pulse-width-modulated switching signals result for example in unwanted electromagnetic interference. Such interference is dealt with in the context of the electromagnetic compatibility (EMC) of a switching-mode power supply.

A distinction is made between line-based interference and interference radiation in free space. In order to keep the impact of electromagnetic interference on other electrical devices due to unwanted coupling low, EMC regulations must be complied with. In these a frequency bandwidth is generally specified to determine average levels of the frequency spectrum of a switching signal, it not being permitted to exceed maximum permissible average interference levels. This frequency bandwidth therefore corresponds to the filter bandwidth of an interference level measuring device. Since interference at very low frequencies is generally not a problem, EMC regulations generally provide for a lower threshold frequency for the determination of average interference levels. At low switching frequencies the first harmonic of a frequency spectrum can be below this threshold frequency, so that harmonics with higher ordinal numbers are of relevance for determining the permissible interference level.

To comply with EMC regulations, complex filters for example are known from the prior art, to prevent electromagnetic interference with propagation along the lines connected to a switching-mode power supply and by way of free space.

It is also known when forming a switching signal to use frequency modulation methods to reduce average interference levels of the frequency spectrum. This attempts to spread the frequency spectrum (spread spectrum technology), resulting in a lower average interference level for the same filter bandwidth of an interference level measuring device.

Such methods generally operate with a triangular or sawtooth modulation function, low modulation frequency and high modulation index and are already implemented in some commercially available control modules for switching-mode power supplies (e.g. topswitches). The peak values of the interference levels are not lowered in this process, as the spectral components have a lower frequency interval from one another than the prescribed filter bandwidth of an interference level measuring device.

To further improve the electromagnetic compatibility of a switching-mode power supply it is also necessary to try to reduce the interference level peak values.

The publication Wiemer I.: *Freiprogrammierbare Ansteuerung eines Aufwärtswandlers* (Freely programmable activation of an upward converter), Studienarbeit TU Dresden, Dresden, Nov. 30, 2001, describes a chaotic frequency modulation method using a large number of discrete modulation frequencies. It is thus possible to tailor the interference spectrum in almost any manner to the available filters and at the same time reduce the peak values of the interference levels. However this method requires the deployment of a high-powered (signal) processor.

SUMMARY OF INVENTION

An object of the invention is to develop the methods known from the prior art for improving the electromagnetic compatibility of a switching-mode power supply.

According to the invention this object is achieved with a method of the type mentioned in the introduction, wherein the switching frequency is modulated at a modulation frequency greater than the frequency bandwidth. The frequency bandwidth here corresponds to the prescribed filter bandwidth of an interference level measuring device. The switching signal is generally configured in the manner of a pulse-width-modulated rectangular signal, with the result that peak levels form at the odd number harmonics without modulation.

The inventive method effectively reduces the peak level of a critical harmonic, by that what are known as harmonic groups being formed in the region of the relevant harmonic. The levels of the frequencies that are found in the frequency spectrum next to the frequency at which the peak level would occur without switching frequency modulation here have approximately the same level as the now reduced peak level. In particular this brings about a reduction of interference levels in the lower region of the frequency spectrum, thereby reducing the required size of the power supply filter components. Filter components that are effective in this frequency domain are particularly large.

The inventive method can be combined with a modulation method according to the prior art as described above to further reduce the average level.

By using only a maximum of five discrete frequencies the method can be implemented as what is known as a frequency shift key method without an additional processor. The method can be implemented in a simple manner with the available switching processor or a control circuit of the switching-mode power supply.

It is advantageous here if a modulation signal with periodic signal form is predefined to modulate the switching frequency, in the simplest instance a rectangular signal with two discrete frequencies.

It is thus possible to reduce the peak level and the average level of interference by up to 6 dB in a specified frequency domain. In particular it is possible to reduce the interference spectrum in the domain up to 10 MHz by up to 6 dB with just two discrete frequencies. It is also possible to achieve a reduction of interference levels in the domain above 10 MHz, with interference generally occurring between the harmonics of the switching frequency.

In a further embodiment of the method a lower threshold frequency is predefined to determine a permissible maximum level of the frequency spectrum of the switching signal and the harmonic, the frequency of which is greater than the threshold frequency and which has the greatest interference level, is set as a critical harmonic of a frequency spectrum of the switching signal without switching frequency modulation. To modulate the switching frequency a modulation index is predefined, which corresponds to the value of the quotient of approximately 1.42 by the ordinal number of the critical harmonic. This ensures that the peak level of the critical harmonic is reduced by the maximum possible amount.

It is also advantageous if the critical harmonic is set as a function of a pulse duty factor of the switching signal. As the pulse duty factor gets smaller, the interference spectrum contains more and more harmonics. A modified pulse duty factor with the same threshold frequency therefore requires the critical harmonic at which the maximum interference level occurs to be reset.

As well as the method the subject matter of the invention also includes a switching-mode power supply, which is activated by means of a microcontroller or a control circuit, the microcontroller or control circuit being set up to implement the inventive method. The method is implemented in a simple manner here in the microcontroller used to control the switching signals (or in the control circuit used to control the switching signals).

BRIEF DESCRIPTION OF THE DRAWINGS

The invention is described in more detail below by way of examples with reference to the schematic diagrams in the accompanying figures, in which.

DETAILED DESCRIPTION OF INVENTION

Figure 1:
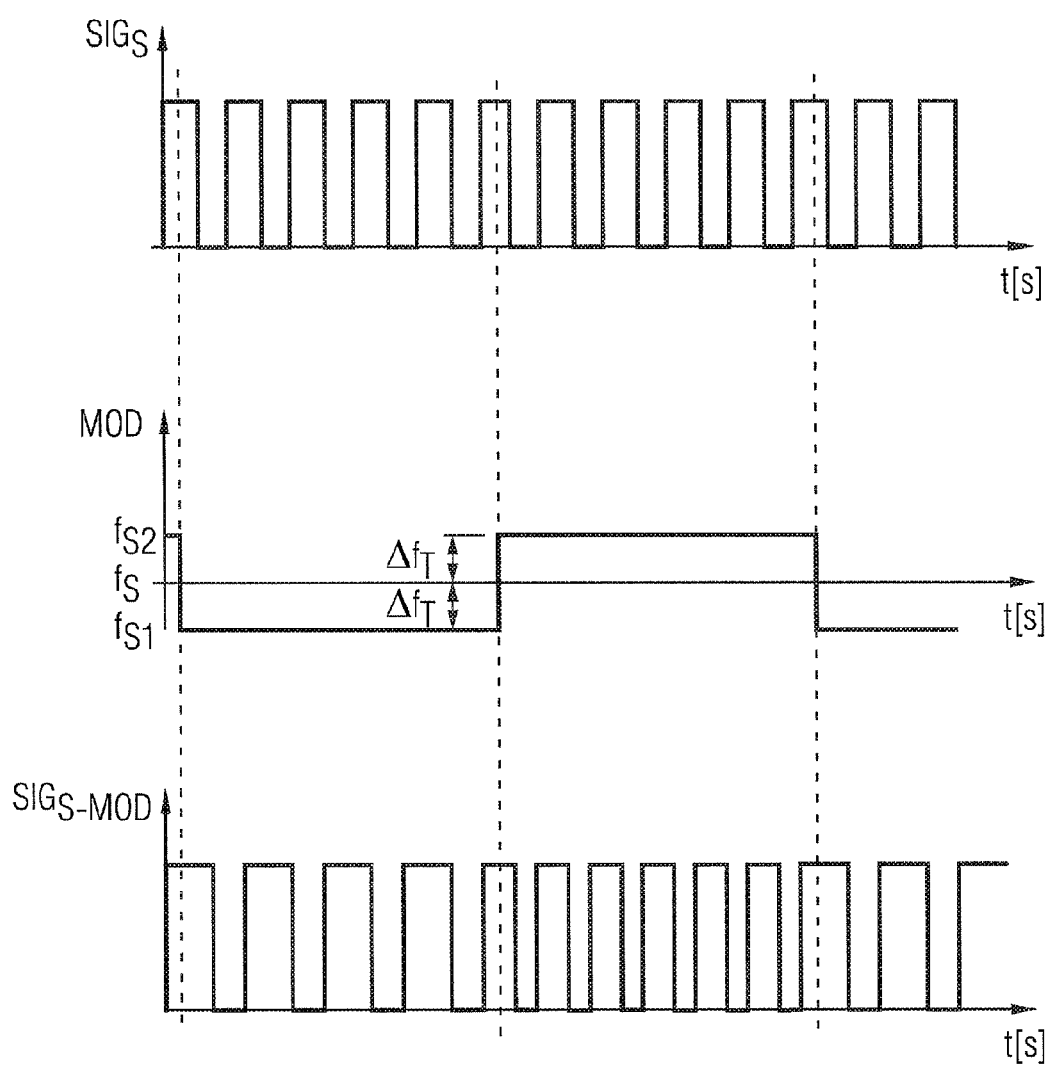
FIG. 1 shows a time domain diagram of a switching signal without modulation, a modulation signal and a modulated switching signal

FIG. 1 shows the patterns of an exemplary switching signal with and without modulation in the time domain. The upper diagram shows the pattern of the unmodulated switching signal $SIG_S$ (e.g. at the output of a switching-mode power supply regulator) at the switching frequency $f_S$ (e.g. 60 kHz) over time t. A pulse duty factor of around 50% is assumed here, so that the odd number harmonics have corresponding levels A in the frequency spectrum in FIG. 2.

In the diagram below the modulation signal MOD is shown as a rectangular function by way of example. A saw-tooth, triangular, sine or other signal can alternatively be predefined. According to the invention the modulation frequency $f_M$ is greater than the prescribed filter bandwidth of an interference level measuring device (e.g. 10.5 kHz for a filter bandwidth of 10 kHz).

Figure 2:
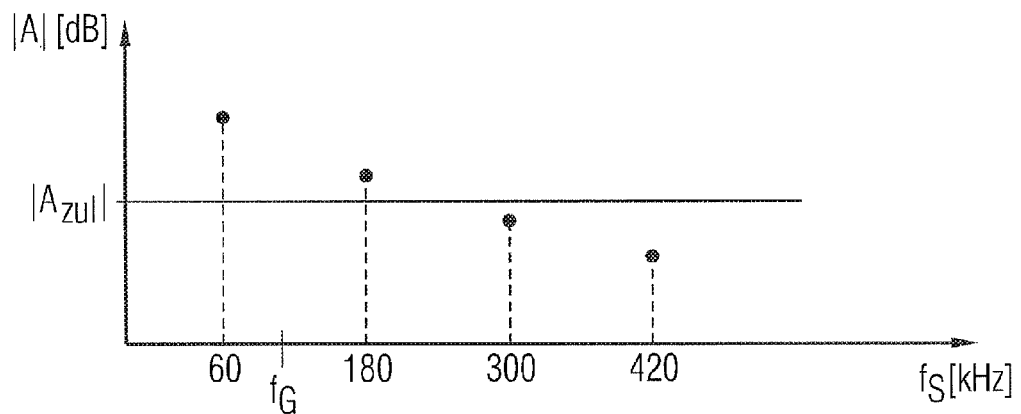
FIG. 2 shows a frequency domain diagram of a switching signal without modulation

FIG. 2 shows the unmodulated signal in the frequency domain. The frequency spectrum has interference levels at the first, third, fifth, seventh, etc. harmonic, the interference level of the first and third harmonics exceeding a permissible level amount $|A_{perm}|$. Since the signs in front of the levels are irrelevant when evaluating electromagnetic compatibility, only the amounts of the levels $|A|$ are shown over the switching frequency $f_S$.

The EMC regulations provide for limitation of interference levels from a threshold frequency $f_G$ (e.g. 100 Hz). Interference levels that occur at frequencies below this threshold frequency $f_G$ are negligible. In the present example a peak interference level occurs above the threshold frequency $f_G$ at the third harmonic, said peak interference level exceeding the permissible level amount $|A_{perm}|$ so the third harmonic is set as the critical harmonic. The Fourier transformation or Laplace transformation for example can be used to determine the critical harmonic.

Figure 3:
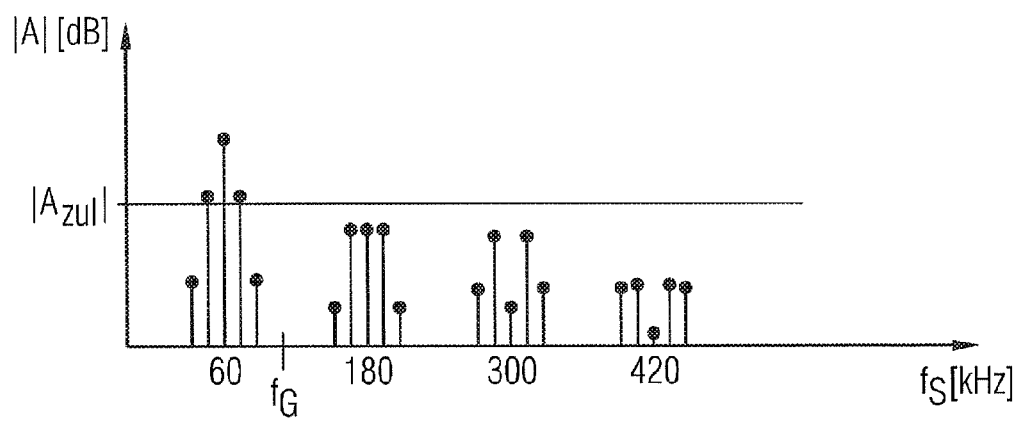
FIG. 3 shows a frequency domain diagram of a modulated switching signal

FIG. 3 shows the frequency spectrum of the modulated switching signal $SIG_{S-MOD}$, the pattern of which over time t is shown in the lower diagram in FIG. 1. The peak level of the third harmonic here is reduced by exemplary application of the inventive method.

The modulation index is advantageously set using the following formula:

$$\eta = \Delta f / f_M \approx 1.42/n$$

Here n is the ordinal number of the critical harmonic (e.g. 3), $f_M$ is the modulation frequency (e.g. 10.5 kHz) and $\Delta f$ the frequency deviation (deviation of the two discrete switching frequencies $f_{S1}$, $f_{S2}$ from the mean frequency $f_S$ in the case of a rectangular modulation signal).

At an exemplary unmodulated switching frequency $f_S$ equal to 60 kH the following discrete switching frequencies $f_{S1}$, $f_{S2}$ result for the frequency shift keying method (modulation with rectangular modulation signal):

$$\Delta f \approx 1.42/n * f_M = 1.42/3 * 10.5 \approx 5 \text{ kHz}$$

$$f_{S1} \approx 55 \text{ kHz}$$

$$f_{S2} \approx 65 \text{ kHz}$$

Because of the high modulation frequency $f_M$ the switching frequency $f_S$ switches between the two discrete frequencies $f_{S1}$, $f_{S2}$ after a few switching pulses (e.g. after 4 or 6 switching pulses, as shown in the lower diagram in FIG. 1).

Harmonic groups therefore form in the region of the harmonic in the frequency spectrum (FIG. 3), the peak levels being reduced by up to 6 dB compared with the unmodulated switching frequency $f_S$ (FIG. 2). The harmonic group corresponding to the critical harmonic in particular has a clearly reduced peak level, as the level values of the three mean frequencies of this harmonic group are of approximately equal size.

As a result of this modulation method all the peak levels of the harmonic groups lie below the permissible level amount $|A_{perm}|$. It is also possible to superimpose a modulation method according to the prior art to reduce the average level.

The invention claimed is:

1. A method of operating a switching-mode power supply, comprising:
   providing a switching element;
   providing a switching signal with a variable switching frequency, the switching element being switched on and off by the switching signal;
   predefining a frequency bandwidth in order to comply with EMC (electromagnetic compatibility) regulations, wherein average levels of a frequency spectrum of the switching signal are determined within the frequency bandwidth;
   modulating the switching frequency at a modulation frequency greater than the frequency bandwidth;
   predefining a lower threshold frequency in order to determine a maximum level of the frequency spectrum of the switching signal;
   setting a critical harmonic of a frequency spectrum of the switching signal without switching frequency modulation as a function of a pulse duty factor of the switching signal, the frequency of the harmonic being greater than the threshold frequency and including the greatest interference level; and predefining a modulation index in order to modulate the switching frequency, wherein the modulation index corresponds to a value of a quotient of approximately 1.42 by an ordinal number of the critical harmonic.

2. The method as claimed in claim 1, further comprising: predefining a modulation signal with periodic signal faun in order to modulate the switching frequency.

3. The method as claimed in claim 1, further comprising: predefining a maximum of five discrete frequencies in order to modulate the switching frequency.

4. The method as claimed in claim 1, further comprising: predefining a maximum of five discrete frequencies in order to modulate the switching frequency.

5. The method as claimed in claim 3, wherein a rectangular signal is predefined as the modulation signal.

6. The method as claimed in claim 4, wherein a rectangular signal is predefined as the modulation signal.

7. The method as claimed in claim 1, wherein the modulation frequency exceeds the frequency bandwidth by approximately 5%.

8. The method as claimed in claim 2, wherein the modulation frequency exceeds the frequency bandwidth by approximately 5%.

9. The method as claimed in claim 3, wherein the modulation frequency exceeds the frequency bandwidth by approximately 5%.

10. A switching-mode power supply, comprising:
a switching element;
a microcontroller or a control circuit controlling the switching element, the microcontroller or control circuit being configured such that
  a switching signal with a variable switching frequency switches the switching element on and off,
  a frequency bandwidth is predefined in order to comply with EMC (electromagnetic compatibility) regulations, wherein average levels of a frequency spectrum of the switching signal are determined within the frequency bandwidth,
  the switching frequency is modulated at a modulation frequency greater than the frequency bandwidth,
  a lower threshold frequency is predefined in order to determine a maximum level of the frequency spectrum of the switching signal,
  a critical harmonic of a frequency spectrum of the switching signal without switching frequency modulation is set as a function of a pulse duty factor of the switching signal, the frequency of the harmonic being greater than the threshold frequency and including the greatest interference level, and
  a modulation index is predefined in order to modulate the switching frequency, wherein the modulation index corresponds to a value of a quotient of approximately 1.42 by an ordinal number of the critical harmonic.

11. The switching-mode power supply as claimed in claim 10, wherein a modulation signal with periodic signal form is predefined in order to modulate the switching frequency.

12. The switching-mode power supply as claimed in claim 10, wherein a maximum of five discrete frequencies is predefined in order to modulate the switching frequency.

13. The switching-mode power supply as claimed in claim 11, wherein a maximum of five discrete frequencies is predefined in order to modulate the switching frequency.

14. The switching-mode power supply as claimed in claim 12, wherein a rectangular signal is predefined as the modulation signal.

15. The switching-mode power supply as claimed in claim 13, wherein a rectangular signal is predefined as the modulation signal.

16. The switching-mode power supply as claimed in claim 10, wherein the modulation frequency exceeds the frequency bandwidth by approximately 5%.

17. The switching-mode power supply as claimed in claim 11, wherein the modulation frequency exceeds the frequency bandwidth by approximately 5%.

18. The switching-mode power supply as claimed in claim 12, wherein the modulation frequency exceeds the frequency bandwidth by approximately 5%.

* * * * *